United States Patent [19]

Eitoku et al.

[11] Patent Number: 4,703,649
[45] Date of Patent: Nov. 3, 1987

[54] THROTTLE VALVE OPENING SENSOR

[75] Inventors: Kenji Eitoku; Kenji Hayashi, both of Obu, Japan

[73] Assignee: Aisan Kogyo KK, Obu, Japan

[21] Appl. No.: 938,862

[22] Filed: Dec. 8, 1986

[30] Foreign Application Priority Data

Dec. 9, 1985 [JP] Japan .............................. 60-189488[U]

[51] Int. Cl.$^4$ ............................................ H01C 10/00
[52] U.S. Cl. ..................................... 73/118.1; 338/199
[58] Field of Search ............... 73/118.1; 338/116, 197, 338/199, 232, 249, 256

[56] References Cited

U.S. PATENT DOCUMENTS 4,430,634  2/1984  Hufford et al. ................. 338/199 X
4,672,356  6/1987  Biermann et al. ............... 338/199 X

FOREIGN PATENT DOCUMENTS 7108846  3/1971  Fed. Rep. of Germany .
3506991  8/1985  Fed. Rep. of Germany .
3447896  8/1985  Fed. Rep. of Germany .
3618927  12/1986 Fed. Rep. of Germany .
57-73332  5/1982  Japan .
59-41708  3/1984  Japan .

Primary Examiner—Jerry W. Myracle
Attorney, Agent, or Firm—Dennison, Meserole, Pollack & Scheiner

[57] ABSTRACT

A throttle valve opening sensor for detecting an opening and a specific opening of a throttle valve, comprising a substrate having a partially sectoral printed pattern formed by an opening detecting portion and a specific opening detecting portion for the throttle valve, a rotor adapted to be rotated in association with rotation of the throttle valve, a housing for rotatably supporting the rotor and having a substrate receiving hole for receiving the substrate, a packing installed in the housing for sealing the substrate, a cover mounted on the outside of the packing for fixing the substrate through the packing to the housing, first and second contacts mounted on the rotor and adapted to slide on the opening detecting portion and the specific opening detecting portion, a plurality of terminals installed in the housing and connected to lead wires for power supply and signal output, and a plurality of conductive elastic members for electrically connecting the terminals to the opening detecting portion and the specific opening detecting portion and biasing the substrate against an inner peripheral point of the substrate receiving hole on the opposite side of the terminals, wherein the center of the printed pattern is positioned on the basis of the inner peripheral point so as to coincide with the center of rotation of the rotor.

3 Claims, 5 Drawing Figures

THROTTLE VALVE OPENING SENSOR

BACKGROUND OF THE INVENTION

The present invention relates to a throttle valve opening sensor for use with an internal combustion engine.

Conventionally, a throttle valve opening sensor includes a housing, a substrate received in a substrate receiving hole formed in the housing, and a rotor adapted to rotate relative to the substrate in the housing. The substrate is fixed by a cover through a packing to the housing. The substrate is provided with a printed pattern of a throttle valve opening detecting portion consisting of a resistor and a collector both being in the configuration of partial sector and an idle position detecting portion consisting of a conductor and a collector. On the other hand, the rotor is provided with a first contact adapted to slide on the resistor and the collector of the opening detecting portion and with a second contact adapted to slide on the conductor and the collector of the idle position detecting portion.

In the conventional throttle valve opening sensor as mentioned above, the rotor is provided with a columnar projection at the central position thereof which projection is inserted into a central hole formed at the substrate, so as to make the center of the printed pattern on the substrate coincident with the center of the rotation of the rotor. However, it is necessary to make the diameter of the central hole of the rotor larger than the diameter of the columnar projection, so as to insert the projection into the central hole. As a result, the center of rotation of the rotor tends to become eccentric from the center of the hole of the substrate, losing the linearity between a rotative angle of the throttle valve and an output voltage. Furthermore, if the rotor is installed under the condition where the columnar projection is in contact with a part of the hole of the substrate, the rotor cannot be smoothly rotated. In the worst case, the columnar projection or the substrate is worn to generate a powder, and the powder is deposited on a sliding surface of the substrate on which the first and second contacts of the rotor are slided, thereby causing generation of electrical noise and adversely affecting accuracy of detection of the throttle valve opening sensor. The aforementioned prior art device is disclosed in Japenese Laid-Open Utility Model Publication No. 57-73332 and 59-41708.

SUMMARY OF THE INVENTION

Accordingly, it is a primary object of the present invention to provide a throttle valve opening sensor which may maintain accurate the linearity between the rotative angle of the throttle valve and the output voltage and improve accuracy of detection of the opening of the throttle valve.

It is another object of the present invention to provide a throttle valve opening sensor which may eliminate the need for forming the columnar projection of the rotor to be inserted into the central hole of the substrate to thereby prevent generation of wearing of the columnar projection or the substrate and suppress generation of the electrical noise.

According to the present invention, there is provided a throttle valve opening sensor for detecting an opening and a specific opening of a throttle valve, comprising a substrate having a plurality sectoral printed pattern formed by an opening detecting portion and a specific opening detecting portion for the throttle valve, a rotor adapted to be rotated in association with rotation of the throttle valve, a housing for rotatably supporting the rotor and having a substrate receiving hole for receiving the substrate, a packing installed in the housing for sealing the substrate, a cover mounted on the outside of the packing for fixing the substrate through the packing to the housing, first and second contacts mounted on the rotor and adapted to slide on the opening detecting portion and the specific opening detecting portion, a plurality of terminals installed in the housing and connected to lead wires for power supply and signal output, and a plurality of conductive elastic members for electrically connecting the terminals to the opening detecting portion and the specific opening detecting portion and biasing the substrate against an inner peripheral point of the substrate receiving hole on the opposite side of the terminals, wherein the center of the printed pattern is positioned on the basis of the inner peripheral point so as to coincide with the center of rotation of the rotor.

The invention will be more fully understood from the following detailed description and appended claims when taken with the drawings.

DETAILED DESCRIPTION OF THE PREFERRED EMBODIMENT

Figure 5:
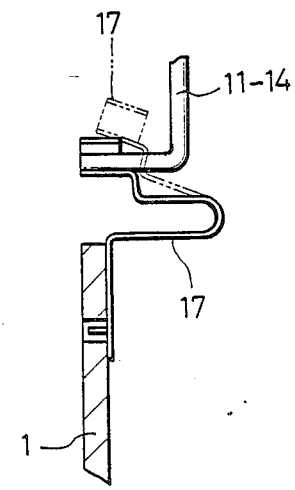
FIG. 5 is an enlarged view of the part D shown i FIG. 4.

Referring now to FIGS. 1 to 5, reference numeral 3 designates a housing for incorporating an electrically insulating substrate 1, a rotor 2 and an external connecting lever 4. The housing 3 is formed with a bearing portion for rotatably supporting a shaft 5 of the rotor 2. The rotor 2 is provided with first and second contacts 9 and 10 each having a pair of contact portions. The substrate 1 is received in a substrate receiving hole 18 formed in the housing 3. Terminals 11 and 14 connected with power supply lead wires and terminals 12 and 13 connected with signal output lead wires are arranged in the housing 3. The terminals 11, 12, 13 and 14 are connected through conductive elastic members 17 to the substrate 1. The substrate 1 is urged against an inner periphery 18a of the substrate receiving hole 18 on the opposite side of the terminals 11 to 14, and is in contact with the inner periphery 18a at a contact point A. As shown in FIG. 5, each of the elastic member 17 is in the configuration shown by a chain line when it is not urged by the terminals 11 to 14. The shaft 5 of the rotor 2 is mounted on the bearing portion of the housing 3. A return spring (torsion spring) 6 is provided between the housing 3 and the external connecting lever 4 in such a manner that one end of the spring 6 is fixed to the lever 4, and the other end is fixed to the housing 3, thereby resiliently restricting the rotation of the lever 4. The external connecting lever 4 is connected to the shaft 5 of the rotor 2.

The rotor 2 is rotated in association with rotation of a throttle valve (not shown), and as a result, the first and second contacts 9 and 10 fixed to the rotor 2 are slided on the upper surfaces of a throttle valve opening detecting portion 15 and an idling position detecting portion 16 both printed on the substrate 1.

Figure 1:
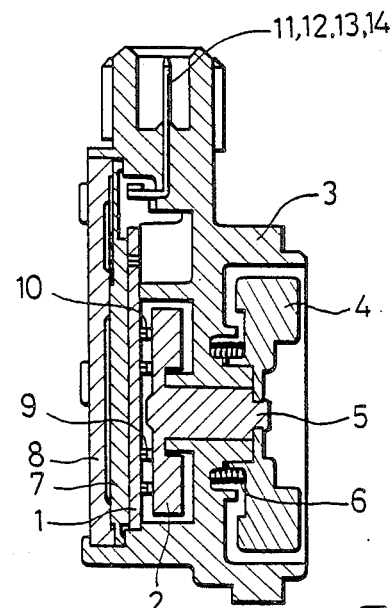
FIG. 1 is a vertical sectional view of the throttle valve opening sensor of a preferred embodiment according to the present invention.
Figure 2:
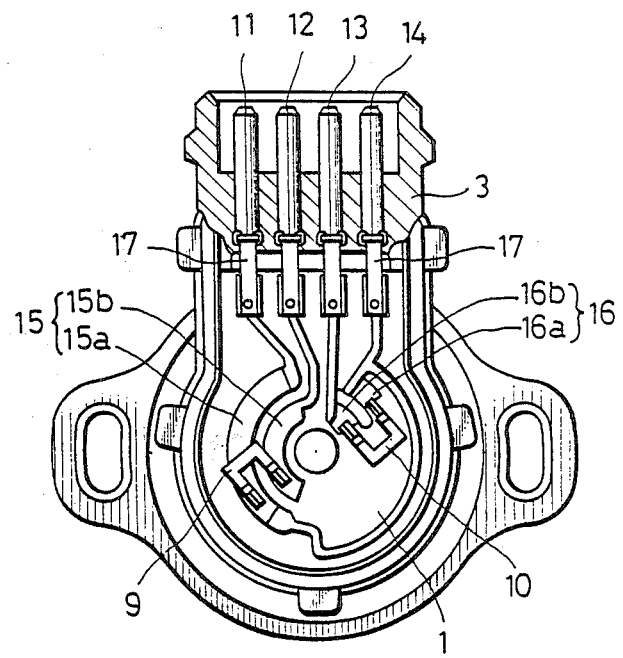
FIG. 2 is a plan view in partial section of FIG. 1.
Figure 3:
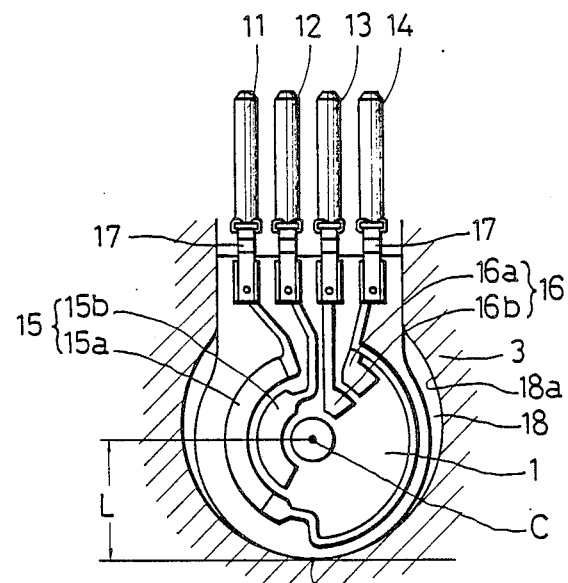
FIG. 3 is a plan view showing positioning of the center of rotation of the rotor.
Figure 4:
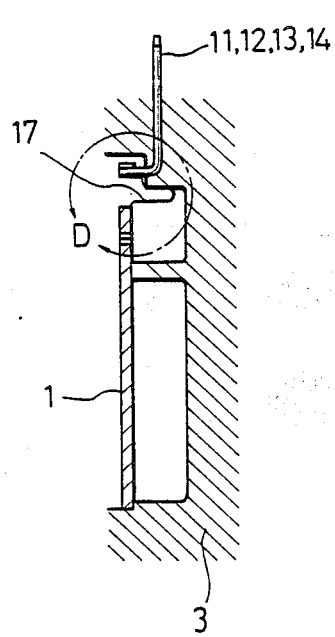
FIG. 4 is a vertical sectional view of the essential part in FIG. 1.

As shown in FIG. 3, the throttle valve opening detecting portion 15 printed on the substrate 1 is in the configuration of partial sector about the center C of a printed pattern, the center C being located from the contact point A at a radial distance L. The idling position detecting portion 16 printed on the substrate 1 is arranged on the opposite side with respect to the center C. The shaft 5 is installed in the housing 3 in coaxial relation to the center C of the printed pattern. The opening detecting portion 15 consists of a resistor 15a and a collector 15b both being in the configuration of partial sector arranged in coaxial relation to each other about the center C, while the idle position detecting portion 16 consists of an outside conductor 16a and an inside collector 16b both being arranged in the same radial direction about the center C. The elastic members 17 are electrically connected to the resistor 15a and the collector 15b of the opening detecting portion 15, and also electrically connected to the conductor 16a and the collector 16b of the idle position detecting portion 16. The conductor 16a and the collector 16b are formed of a metal conductor such as Ag or Ag alloy. Reference numerals 7 and 8 shown in FIG. 1 designate an elastic packing for sealing the substrate 1 and a cover for covering the packing 7, respectively.

As is described above, the throttle valve opening detecting portion 15 consisting of the resistor 15a and the collector 15b and the idle position detecting portion 16 consisting of the conductor 16a and the collector 16b are arranged in coaxial relation to the center C of the printed pattern as decided with reference to the contact point A where the substrate 1 is in contact with the inner periphery 18a of the substrate receiving hole 18. Furthermore, the center C coincides with the axis of the shaft 5 of the rotor 2. Therefore, when the rotor 2 is rotated, the contacts 9 and 10 are smoothly slided on the resistor 15a and the collector 15b of the opening detecting portion 15 and the conductor 16a and the collector 16b of the idle position detecting portion 16. The linearity between the rotative angle of the throttle valve and the output voltage is maintained accurate to thereby improve the accuracy of the throttle valve opening sensor.

Having thus described the preferred embodiment of the invention, it should be understood that numerous structural modifications and adaptations may be made without departing from the spirit of the invention.

What is claimed is:

1. A throttle valve opening sensor for detecting an opening and a specific opening of a throttle valve, comprising a substrate having a partially sectoral printed pattern formed by an opening detecting portion and a specific opening detecting portion for said throttle valve, a rotor adapted to be rotated in association with rotation of said throttle valve, a housing for rotatably supporting said rotor and having a substrate receiving hole for receiving said substrate, a packing installed in said housing for sealing said substrate, a cover mounted on the outside of said packing for fixing said substrate through said packing to said housing, first and second contacts mounted on said rotor and adapted to slide on said opening detecting portion and said specific opening detecting portion, a plurality of terminals installed in said housing and connected to lead wires for power supply and signal output, and a plurality of conductive elastic members for electrically connecting said terminals to said opening detecting portion and said specific opening detecting portion and biasing said substrate against an inner peripheral point of said substrate receiving hole on the opposite side of said terminals, wherein the center of said printed pattern is positioned on the basis of said inner peripheral point so as to coincide with the center of rotation of said rotor.

2. The throttle valve opening sensor as defined in claim 1, wherein said opening detecting portion comprises a resistor and a collector both electrically connected through said elastic members to said terminals, said resistor and said collector being in the configuration of partial sector and arranged in coaxial relation to each other.

3. The throttle valve opening sensor as defined in claim 1, wherein said specific opening detecting portion comprises idle position detecting means having a conductor and a collector both electrically connected through said elastic members to said terminals, said conductor and said collector being in the configuration of partial sector and arranged in coaxial relation to each other on the opposite side of said opening detecting portion.

* * * * *